Figure 2:
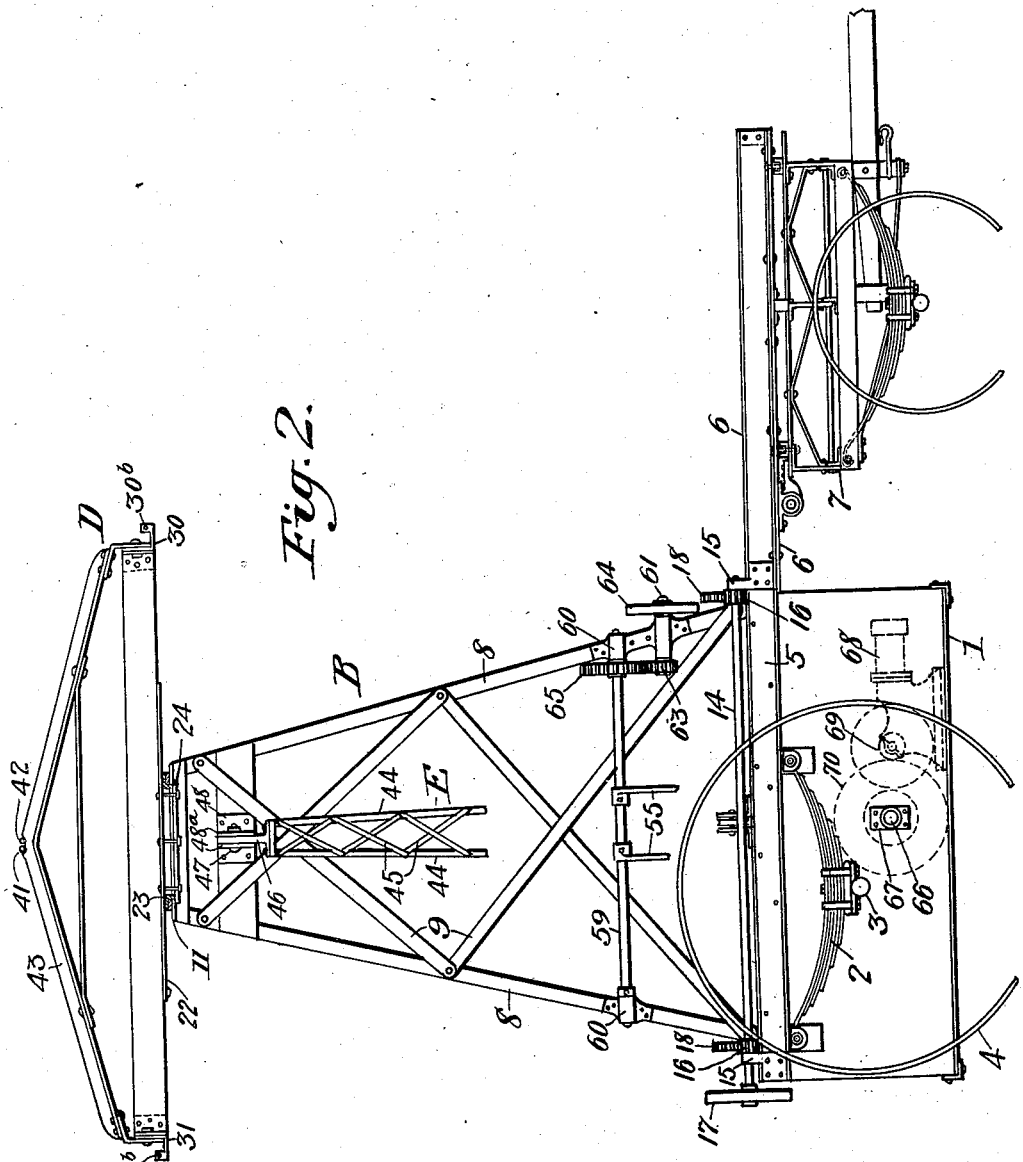

W. KASSEBEER.
APPARATUS FOR CONVEYING AND LOADING CROPS.
APPLICATION FILED AUG. 27, 1910.
1,012,650.
Patented Dec. 26, 1911.
5 SHEETS—SHEET 1.
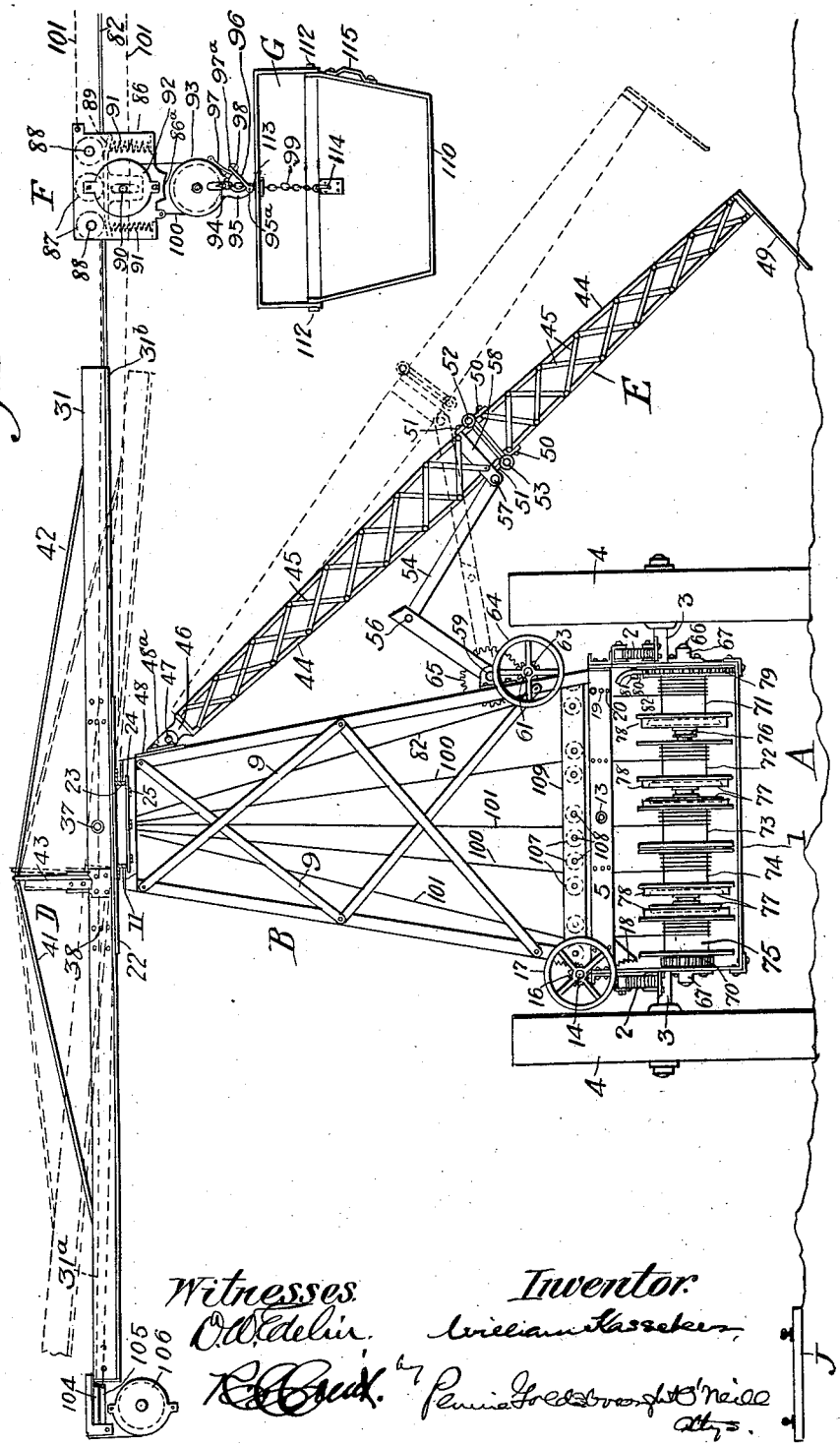

W. KASSEBEER.
APPARATUS FOR CONVEYING AND LOADING CROPS.
APPLICATION FILED AUG. 27, 1910.
1,012,650.
Patented Dec. 26, 1911.
5 SHEETS—SHEET 2.
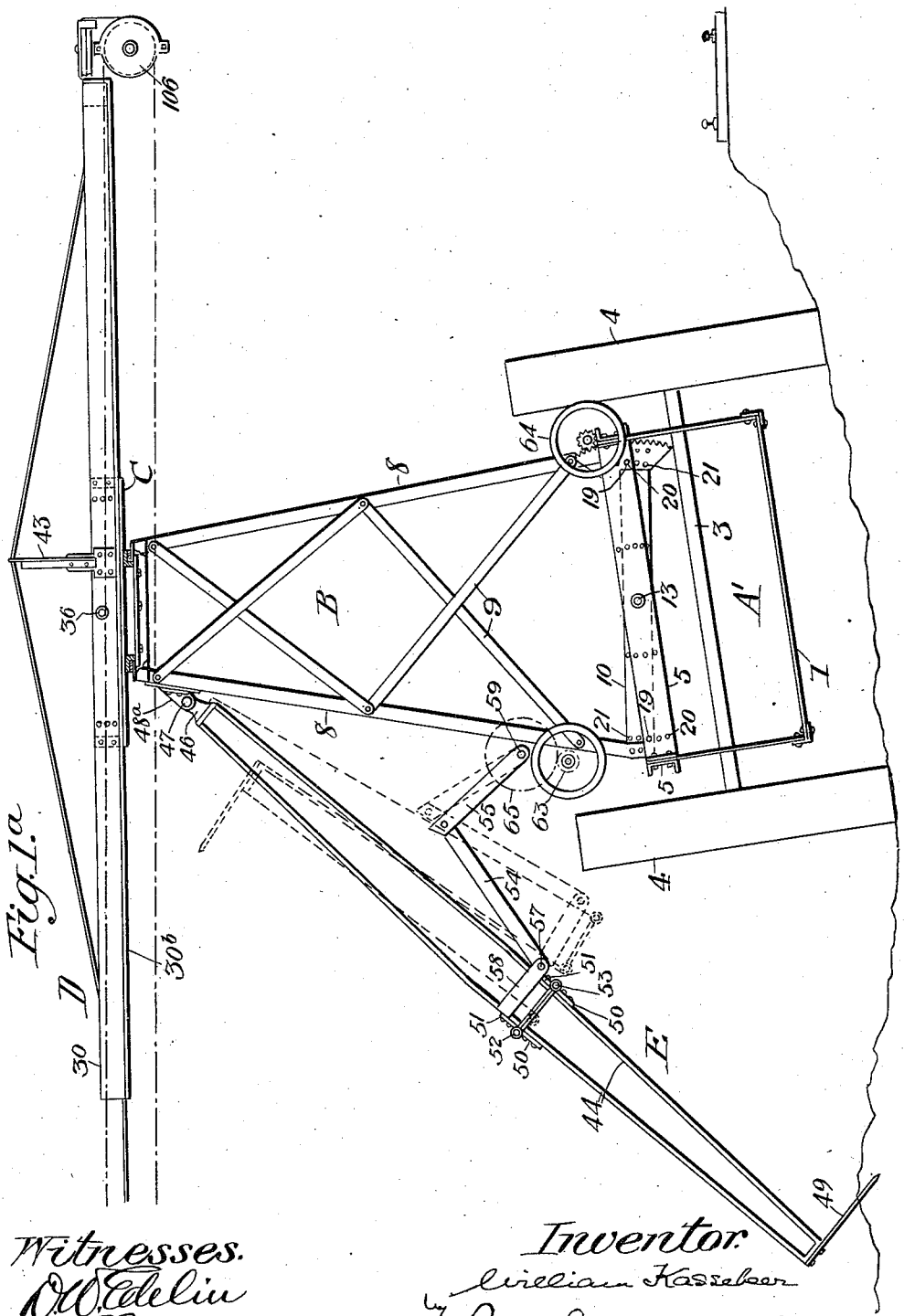

W. KASSEBEER.
APPARATUS FOR CONVEYING AND LOADING CROPS.
APPLICATION FILED AUG. 27, 1910.

1,012,650.

Patented Dec. 26, 1911.

Witnesses.
Inventor.

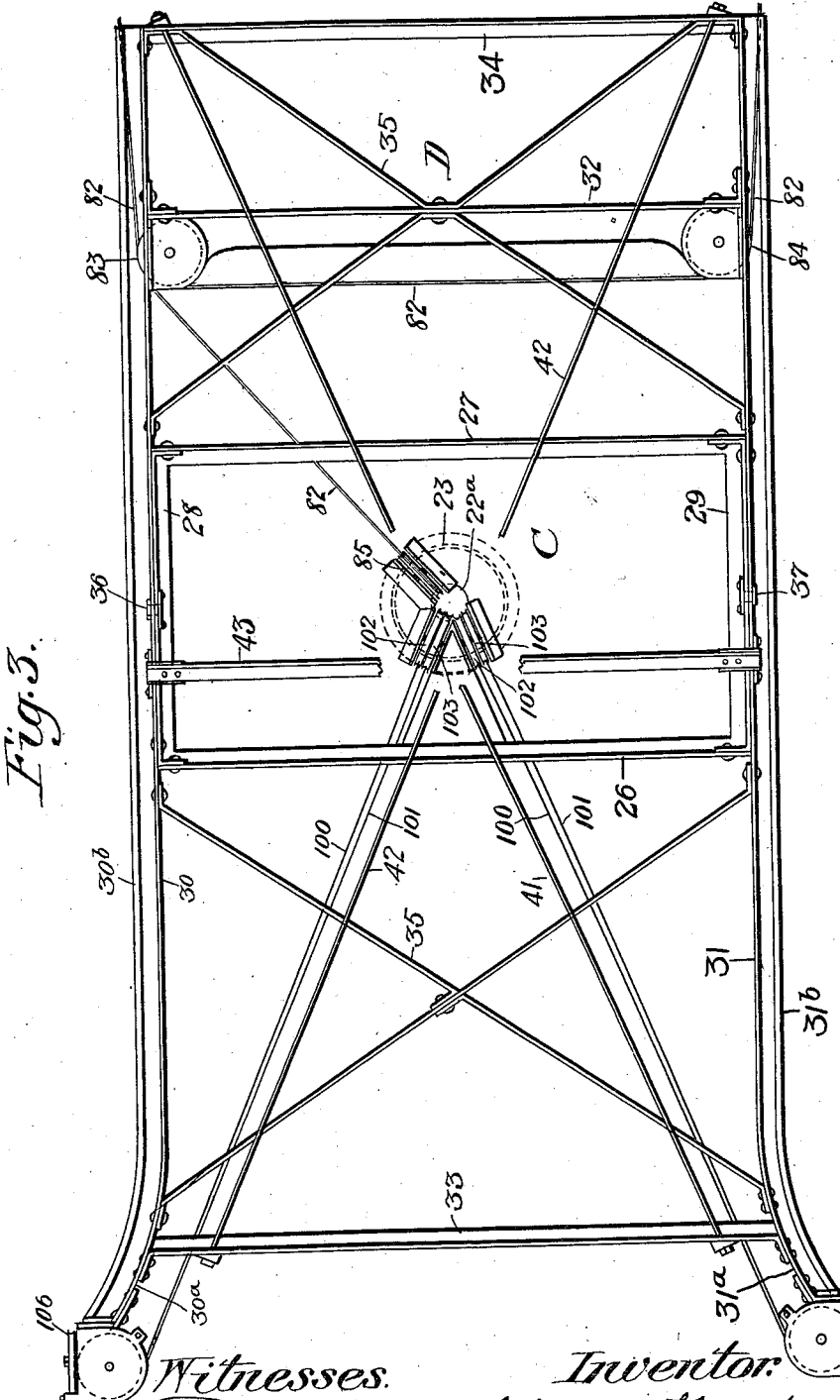

W. KASSEBEER.
APPARATUS FOR CONVEYING AND LOADING CROPS.
APPLICATION FILED AUG. 27, 1910.
1,012,650.
Patented Dec. 26, 1911.
5 SHEETS—SHEET 5.
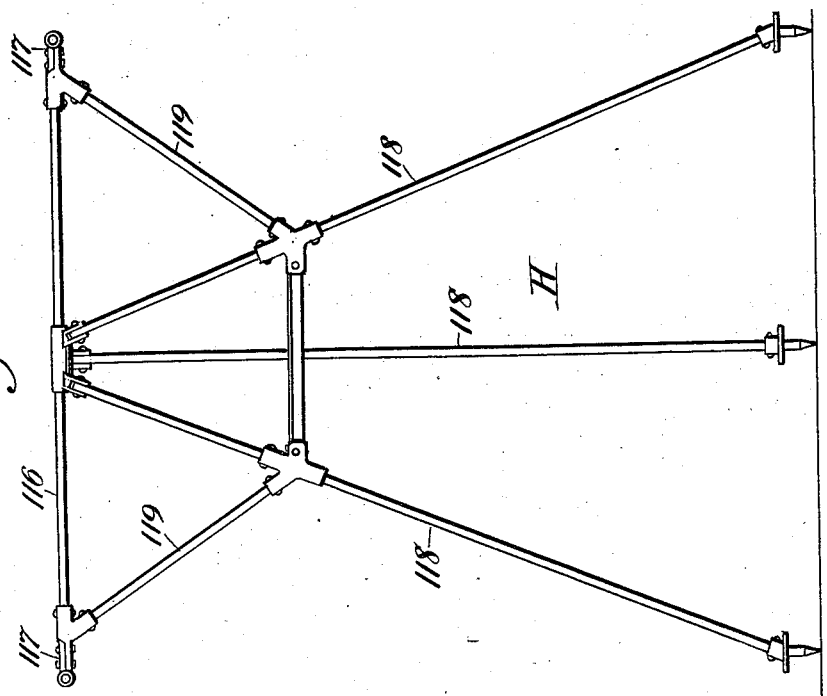
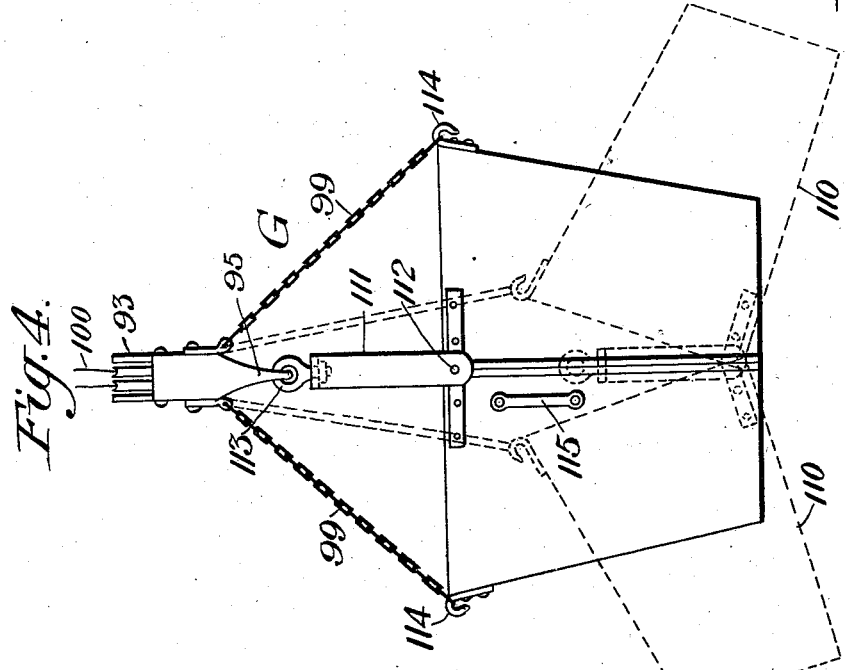

UNITED STATES PATENT OFFICE.

WILLIAM KASSEBEER, OF LIHUE, TERRITORY OF HAWAII.

APPARATUS FOR CONVEYING AND LOADING CROPS.

1,012,650.   Specification of Letters Patent.   Patented Dec. 26, 1911.

Application filed August 27, 1910. Serial No. 579,199.

*To all whom it may concern:*

Be it known that I, WILLIAM KASSEBEER, a citizen of the German Empire, residing at Lihue, in the county of Kauai, Territory of Hawaii, have invented certain new and useful Improvements in Apparatus for Conveying and Loading Crops; and I do hereby declare the following to be a full, clear, and exact description of the invention, such as will enable others skilled in the art to which it appertains to make and use the same.

My invention relates to apparatus for conveying and loading crops, and is particularly designed for use in cane fields of sugar plantations where permanent or portable railway-tracks are employed to convey the cane when loaded on cars from the field to the mill.

The object of my invention is to reduce the manual labor heretofore required for loading the cut cane onto the cars, and thereby cut down the cost of same.

The invention contemplates two tower-wagons between two lines of railway-tracks in the cane field, a frame adjustably supported by each tower with one end of each frame overhanging one of said lines of track, a cable connecting said frames and means for adjusting the tension of the cable, baskets or buckets in which the cut cane is placed by laborers, and means for elevating a loaded bucket and for conveying it upon the cable and the edge of a frame to a position over a car upon the railway-track under the overhanging end of the frame, whereupon the cane is dumped from the bucket into the car, the empty bucket being then returned to the field and exchanged for a loaded bucket.

The invention also contemplates novel means for bracing the towers, and for adjusting the inclination of the towers with respect to the wagons which support them.

By my apparatus the loaded buckets may be conveyed from the field between the towers to either or to both of the railways alongside of the two tower-wagons, the cable being stretched between both corners of the ends of the frames which face one another, all of which will hereinafter more fully appear.

The truck under the front end of the platform of each tower-wagon may be of the type such as was referred to in my application for U. S. patent filed July 20, 1910, Serial No. 572,854.

In the accompanying drawings, Figures 1 and 1ª show in conjunction an end elevation of apparatus embodying the invention. Fig. 2 is a side elevation of one of the tower-wagons. Fig. 3 is a plan view of one of the frames supported upon the tower. Fig. 4 is an elevation of one of the buckets and is a view at right angles to the bucket shown in Fig. 1. Fig. 5 shows a prop for supporting the cable between the tower-wagons.

Similar characters of reference indicate similar parts throughout the several views.

Referring to the drawings, the two tower-wagons A and A' are similar in construction and are each provided with a body 1 preferably of plate and mounted by the springs 2 on the axle 3 provided with wheels 4 in a well known manner. A rectangular frame 5 is formed by channels or the like riveted to the top of the body 1. A platform 6 is secured to the front of the body 1, and is supported by a truck 7 preferably of the kind referred to above and therefore a description of which is now omitted.

The towers B are preferably of structural material, such as angles for the inclined corner posts 8 with bars for the diagonal bracing 9, the posts 8 being secured at their lower ends to a rectangular frame 10 of channels or angles, and their upper ends being fastened to a plate 11. The frame 10 is hinged within the frame 5 by pins or bolts 13 in the center of the front and rear ends of the frames 10 and 5 respectively. A shaft 14 is journaled in boxes 15 secured to one side of the frame 5, and pinions 16 and a hand operating wheel 17 are secured to said shaft. Segments of a circular rack 18 are fastened to the ends of the frame 10 and are adapted to mesh with the pinions 16. The frame 10 may be turned on the bolts 12 13 as pivots by operating the hand wheel 17, and a pin 19 may be inserted in corresponding holes 20 21 provided in the frames 5 and 10 respectively to lock said frames in various relative positions. It will now be noted that the inclinations of the towers B with respect to the wagons A A' which support said towers can be altered as desired, so that if the wagons are tilted by the unevenness of the ground, for example, causing one wheel 4 to be higher than the other wheel, the towers can be made vertical as shown in Fig. 1ᵃ.

A rectangular plate 22 is provided on its lower side with a ring 23. A hole is cut in the center of the plate 11 which forms the top of each tower B, and the ring 23 fits loosely within and projects slightly through said hole. A retaining washer 24 is secured to the plate 22, and below the ring 23 by the bolts 25, the washer 24 being larger than the hole 11ᵃ, to prevent the accidental removal of the plate 22 from the top of the tower B. Two angles 26 and 27 are riveted to opposite edges respectively of the plate 22. Shorter angles 28 29 are connected to the ends of the angles 26 27 respectively to form a rectangular frame C. The frames C are adapted to be turned in a horizontal plane about the towers B.

The frames D are composed of two parallel angle bars 30 31 connected by the cross bar 32, the angles 33 34, and the diagonal braces 35. One end 30ᵃ 31ᵃ of each angle 30 31 is preferably curved slightly outward or away from one another, as shown Fig. 3. A track 30ᵇ 31ᵇ is either secured to or forms a part of the horizontal flange of each angle 30 31. The frames D are hinged to the frames C by bolts 36 37 through the centers of the vertical flanges of the angles 30 28 and 31 29 respectively; and the frames D may be tilted slightly with respect to the frames C and then be secured in any one of various positions desired by means of pins or bolts 38 through corresponding holes 40 in said angles. Each frame D may be trussed to stiffen same by means of truss rods 41 42 connected diagonally to the angles 30 31, said rods crossing upon an upwardly arched cross brace 43 secured to the angles 30 31 near the middle of said frame.

A brace E is provided for each tower B, and is preferably made of angles 44 with latticed bracing 45. The upper ends of the angles 44 are secured to a casting 46, which is hinged by the bolt 47 between the lugs 48ᵃ of the casting 48 secured to the posts 8 near the top of one side of the tower B. A heavy plate shoe 49 is secured to the lower end of the angles 44. If desired, the brace E may be made in two sections, in which case hinge straps 50 51 are riveted to the angles 44 near their abutting ends on the upper and lower sides respectively of the brace E. The hinge straps 50 51 are provided with hinge pins or bolts 52 53 respectively, and when both are in place the sections are rigidly connected, but when either is removed the sections are hinged. The toggle-bars 54 55 are jointed by the bolt 56. The ends of the bars 54 are hinged by the bolt 57 to the straps 58 secured to the sides of the brace E near its middle, and the ends of the bars 55 are secured to a shaft 59 which is journaled in boxes 60 attached to the posts 8 on the side of the tower B to which the brace E is hinged. A shaft 61 is journaled in a box 62 secured to a post 8, and a pinion 63 and a hand wheel 64 are secured to said shaft 61. The pinion 63 meshes with a spur gear 65 keyed to the shaft 59.

A drum shaft 66 is journaled in boxes 67 secured to the body 1 of the wagon A. The shaft 66 is revolved in any suitable manner, for example, by means of a gasolene engine 68 the shaft of which is provided with a pinion 69 meshing with a spur gear 70 keyed to the drum shaft 66. A cable drum 71 and two pairs of trolley operating rope drums 72 73 and 74 75 respectively are loosely mounted upon the shaft 66. The cable drum 71 is provided with a friction-clutch 76 and each of the other drums (72–75 inclusive) has a similar friction-clutch 77 of any well known type. Each of the drums is also provided with a brake-band 78. The cable drum 71 also has a ratchet-wheel 79 attached to one end. A pawl 80, pivoted on a stud 81 to the side of the body 1 of the wagon A, is adapted to engage the teeth of the ratchet-wheel 79.

One end of the cable 82 is fastened to the angle 31 of the frame D which is over the wagon A which carries the drum 71. The cable 82 is then led to the angle 30 of the frame D over the other wagon A', and is passed over the sheaves 83 and 84 mounted horizontally on the cross bar 32 of said frame. The sheave 84 is not necessary however for the frame D over the wagon A, as the cable 82 may be fastened in any suitable manner to the angle 31 of said frame. The cable 82 is then brought back to the angle 30 of the frame over the wagon A and is passed over a sheave 85, which is mounted vertically on the plate 22, the direction of the cable being changed by passing over the sheave 83 of said frame. The cable 82 is then passed through a hole 22ᵃ cut in the plate 22, through the tower B, and is wound upon the drum 71. It will now be noted that the cable can be tightened between the angles 31 and 30 at the rear of the two frames D and between the angles 31 and 30 at the front of said frames respectively by the same operation, also that the cable when so tightened forms in conjunction with said angles two continuous paths for trolleys. Two trolleys F are therefore provided, each preferably constructed as follows: A plate 86 is provided with its upper edge bent over like an inverted U, within which two or three small grooved wheels 87 are mounted to turn on the bolts 88. A shoe 89 with its ends bent downward is provided and is held loosely against the plate 86 below the wheels 87 by the bolt 90. Springs 91 are secured to the plate 86 to force the shoe 89 upward toward the wheels 87. By forcing the shoe 89 downward against the action of the springs 91, the cable 82 may be admitted between the shoe 89 and the grooved wheels 87. The track 30<sup>b</sup> or 31<sup>b</sup> may be similarly admitted. The object of the shoe 89 is to prevent the accidental removal of the trolley F from the cable or from either of said tracks. A sheave 92 is mounted to turn on the outside of the plate 86 on the bolt 90.

With each trolley F is provided a sheave-block 93 having a lug 94 and a short hook 95 at its lower end and rigidly attached to said block. A link 96 is formed to swing in a hole 95<sup>a</sup> in the hook 95. The link 96 can be swung upward to engage a crotch 97<sup>a</sup> in the lever 97, which is pivoted by the pin 98 to the lug 94. By swinging the lever 97 downward or away from the block 93, the link 96 is disengaged from the crotch 97<sup>a</sup>. A short chain 99 is secured to each side of the block 93.

A rope 100 is provided on each drum 72 and 74 for pulling the trolleys F in one direction and also for raising and lowering the sheave-blocks 93. A rope 101 is provided on each drum 73 and 75 for pulling the trolleys F in the opposite direction. The ropes 100 101 are carried upward from the drums through the tower B and the hole 22<sup>a</sup> in the plate 22 and over sheaves 102 103 mounted vertically on said plate 22 and then over sheaves 104 105 mounted horizontally at the outer end of the curved portions 30<sup>a</sup> 31<sup>a</sup> of the angles 30 31 respectively of the frame D over the wagon A. From the sheave 104 the rope 100 passes over the sheave 92 of the trolley F, and then over the sheave of the block 93, and the end is fastened to the plate 86 of said trolley. From the sheave 105 the rope 101 is carried across to the other frame D over the wagon A', and is passed over one of the sheaves 106 mounted vertically at the outer ends of the curved portions 30<sup>a</sup> 31<sup>a</sup> of the angles 30 31 of said frame. The rope 101 is then brought back and its end is fastened to the plate 86 of the trolley F. The wheels 107, mounted to turn on the bolts 108 between two flat bars 109 supported on edge by the frame 10 at the base of the tower B and above the drum shaft 66, may be provided for guiding the cable 82 and the ropes 100 and 101. It will now be noted that the object in curving the ends 30<sup>a</sup> 31<sup>a</sup> of the frame D is that the ropes 100 and 101 may be kept away from the cable 82 and not foul same or the trolley F.

A number of baskets or buckets G are provided, preferably constructed as follows: The body of woven wire netting or of plate is made in halves 110, which are hinged near the top of their abutting ends to a bail 111 by the pins 112 with their ends riveted over. An eye-bolt 113 is swiveled at the center of the bail 111, and a hook 114 is attached at the center of the upper edge of the side of each half bucket 110. A handle 115 may be attached to one end of each half bucket 110. When not in use these buckets G may be carried upon the platform 6 of the wagons A A'.

The mode of operation will now be apparent. The apparatus having been conveyed to the field to be harvested, the tower-wagons A A' are located opposite one another, each so that its frame D will overhang one of the lines of railway-tracks. If necessary the towers B are brought to a vertical position by operating the hand wheel 17 and the pin 19 is inserted in the holes 20 21 to the tower B to its wagon A or A'. Each brace E is lowered, swinging on the hinge bolt 47, by operating the hand wheel 64 until the plate shoe 49 is embedded in the ground. The frames C are turned if necessary to bring the frames D in line with each other. The bolts 38 are secured in the holes 39 40 to secure the frames D in the desired positions. The cable 82, the ropes 100 and 101, the trolleys F and the blocks 93 are now rigged as described. The engine 68 revolves the drum shaft 66. The clutch 76 is thrown in and the cable 82 is wound on the drum 71 until it becomes taut, whereupon the brake 78 is applied and the clutch 76 is released, the pawl 80 is allowed to engage the ratchet-wheel 79 and the brake 78 is released. By operating the clutches 77, the ropes 100 can be wound upon the drums 72 and 74, and the ropes 101 upon the drums 73 and 75 respectively. If, for example, the drum 72 is revolved with the shaft 66 its rope 100 is wound upon the drum and the block 93 is raised until it abuts the under side 86<sup>a</sup> of the plate 86 of the trolley F whereupon the trolley is pulled. At the same time the rope 101 attached to this trolley will be pulled and will unwind from the drum 73. When the trolley F has arrived at the desired position, either on the cable 82 or on the track 30<sup>b</sup> or 31<sup>b</sup> of the frames D, the clutch 77 is released from the drum 72 and the brake 78 is applied to the drums 72 and 73. By now releasing the brake on the drum 72 the rope 100 is allowed to unwind sufficiently to permit the block 93 to lower any desired amount, the weight of the block 93 being sufficient to pull the rope 100 and particularly so when a bucket G is attached. When the block 93 is thus lowered, a loaded bucket G thereunder may be easily attached to said block. The link 96 is passed through the eye bolt 113 and is swung so as to engage the crotch 97<sup>a</sup> and the lever 97 is then moved upward toward the block 93 locking the eye bolt 113 on the hook 95. The ends of the chains 99 are now slipped over the hooks 114. When the block 93 is now raised the bucket G with its load is also raised. If the lever 97 is now pulled downward and away from the block 93, the link 96 can be released from the crotch 97ª permitting the eye 113 to slip off from the hook 95, whereupon the bucket G is supported only by the chains 99, the halves 110 are caused to separate swinging on the pins 112, and to take the position shown by dotted lines in Fig. 4, the load being thus dumped from the bucket G. It will now be noted that a loaded bucket can be picked up in the field between the wagons A and A' and be conveyed in either direction to the outer end of a frame D and its load can then be dumped into a car under same; that the empty bucket can be returned and exchanged for a loaded bucket; and that these operations can be carried on simultaneously on the front and rear sides of the apparatus. When there is a wide distance between the two tower-wagons A and A', a prop H can be used for supporting the cable 82, Fig. 5. The cross bar 116 is provided at each end with a clamp 117 to receive the cable 82, the distance between the clamps being made the same as the distance between the angles 30 and 31 of the frames D. The trolleys F can pass over the clamps 117. Three legs 118 are hinged at their upper ends to the cross bar 116 so as to form a tripod. The ends of the cross bar 116 may be stiffened by braces 119, connected to the legs 118, as shown. When the cane in the field between the two tower-wagons has thus been loaded onto cars, the apparatus is moved to a new position where the operations are repeated.

I claim:

1. Apparatus for conveying and loading crops, comprising two wagons, a tower adjustably supported on each wagon, a brace hinged near the top of each tower, a frame adjustably supported by each tower, a cable connecting the ends of the frames which face one another, means for adjusting the tension of said cable, a trolley adapted to travel on said cable and frames, and means for pulling the trolley in either direction and for raising or lowering a bucket below said trolley.

2. In apparatus for conveying and loading crops, the combination of a wheeled wagon frame, a tower rising therefrom and capable of tilting movement with respect to said wagon frame, a frame adapted to turn in a horizontal plane at the top of the tower, and a track frame carried by said last named frame.

3. In apparatus for conveying and loading crops, the combination of a wheeled wagon, a tower rising therefrom, means for tilting the tower with respect to the wagon in order to bring the former into upright position on uneven ground, a frame movable in a horizontal plane at the top of the tower, and a track frame hinged in a vertical plane on said last named frame.

4. In apparatus for conveying and loading crops, the combination of a wheeled wagon, a tower rising therefrom, a track frame on the top of the tower, a brace pivoted adjacent the top of the tower and having a ground engaging shoe, and manually operated mechanism for moving said brace angularly with respect to the tower and wagon and thereby working said shoe into the ground.

5. In apparatus for conveying and loading crops, the combination of a wheeled wagon, a tower rising therefrom, a track frame carried at the upper end of the tower, a brace pivoted to the tower and having a ground engaging shoe, manually operated means to raise and lower said brace, and manually operated means to tilt the tower with respect to the wagon in order that the former may be given an upright position on uneven ground, as described.

6. In apparatus for conveying and loading crops, the combination of a wagon, a tower rising therefrom, a track frame hinged to the top of the tower to move in a vertical plane, a cable-way coacting with said track frame, and a plurality of hoisting drums carried by the wagon.

7. In apparatus for conveying and loading crops, the combination of a wagon, a tower rising from the same, manually operable means to tilt the tower with respect to the wagon, a frame mounted to turn on the top of the tower, a track frame hinged to said last named frame to move in a vertical plane, a brace pivoted to the upper portion of the tower, said brace having a ground engaging shoe, and manually operable means for forcing said brace into the ground and raising it therefrom.

In testimony whereof I affix my signature, in presence of two witnesses.

WILLIAM KASSEBEER.

Witnesses:
 ROBT. J. PRATT,
 P. H. BURNETTE.

Copies of this patent may be obtained for five cents each, by addressing the "Commissioner of Patents, Washington, D. C."